J. A. CAMERON.
MOVING PICTURE MACHINE.
APPLICATION FILED SEPT. 24, 1912. RENEWED DEC. 17, 1917.
1,274,242.
Patented July 30, 1918.
2 SHEETS—SHEET 1.
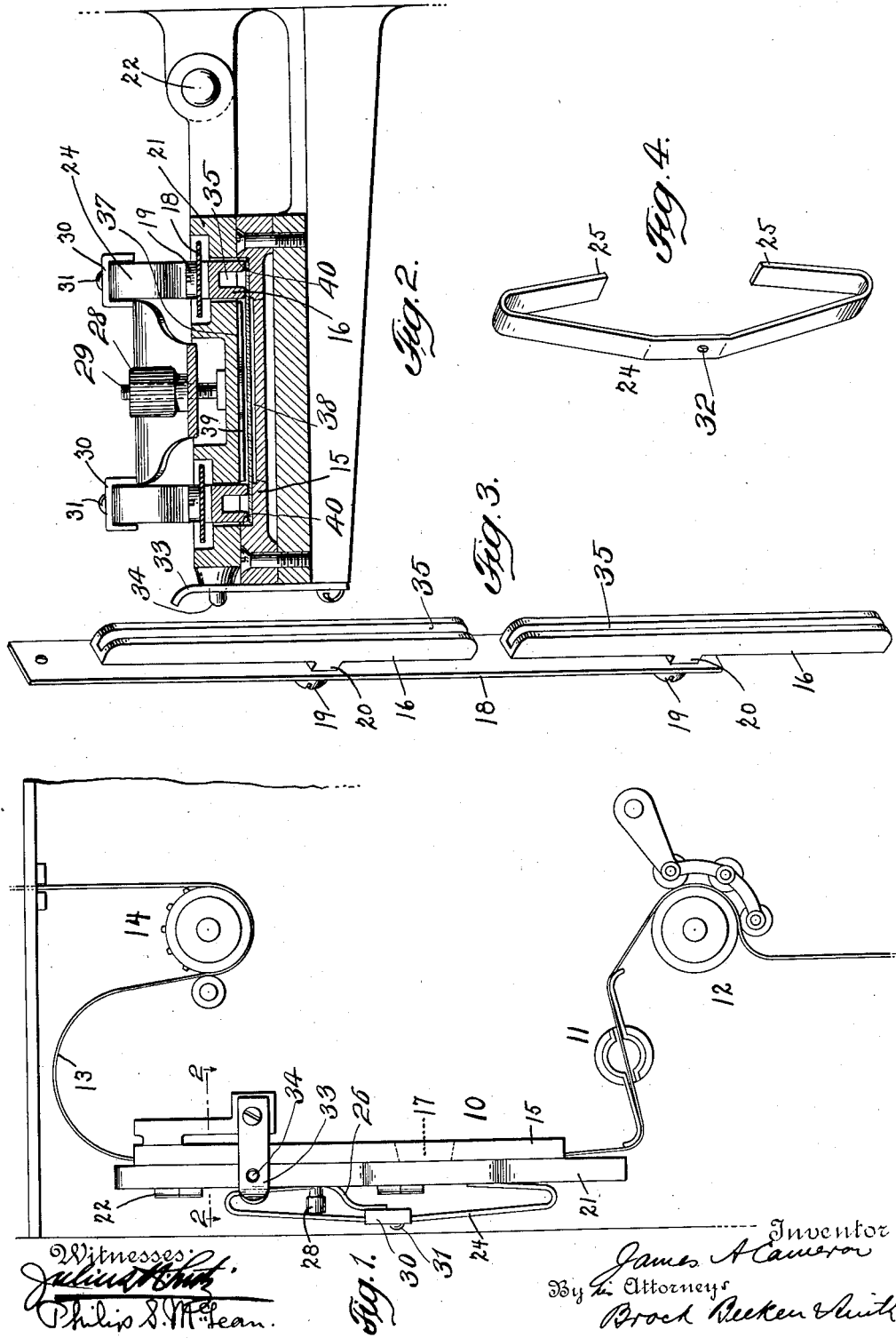

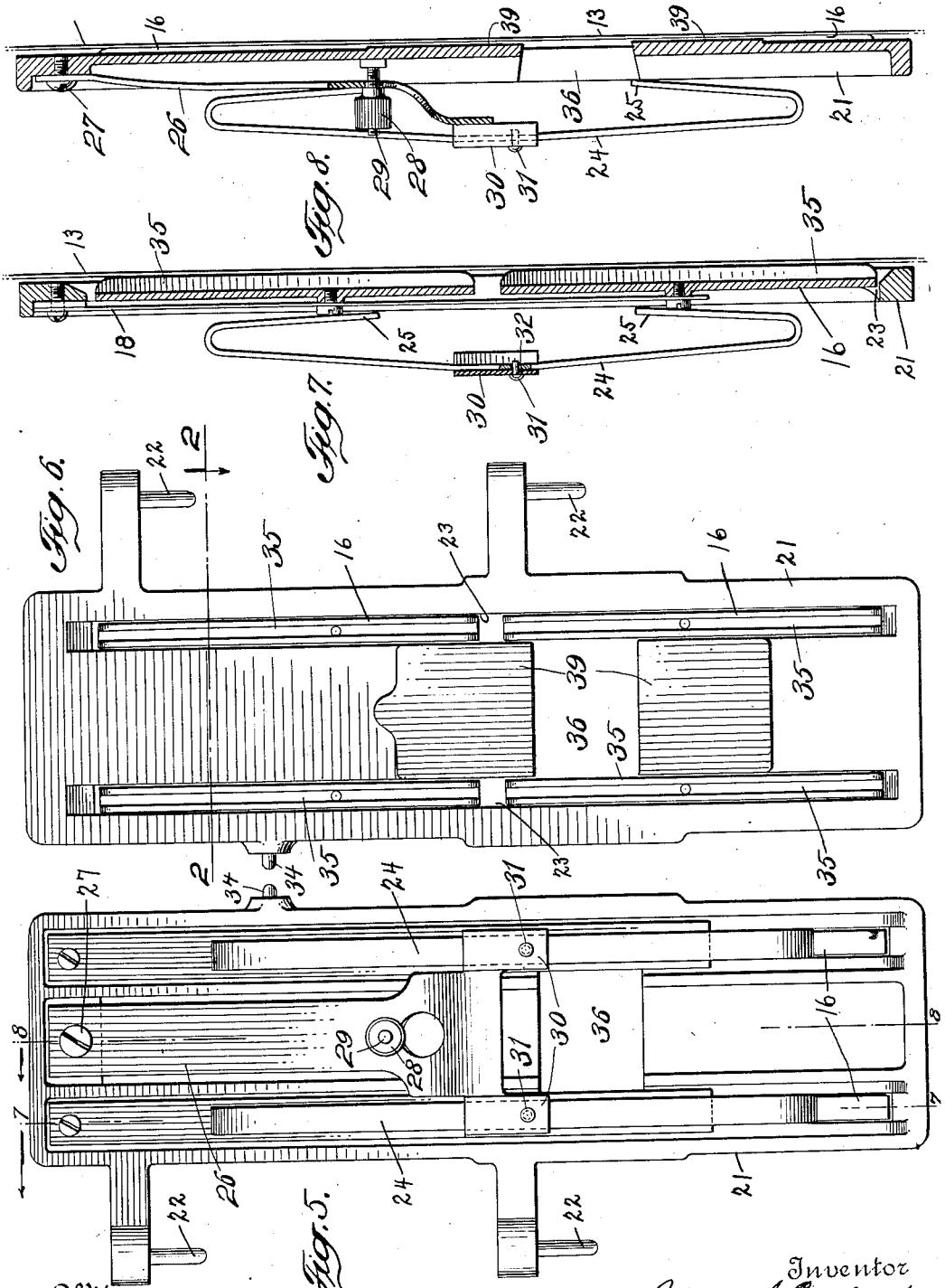

UNITED STATES PATENT OFFICE.

JAMES A. CAMERON, OF BROOKLYN, NEW YORK, ASSIGNOR TO CAMERON PICTURE MACHINE CO., A CORPORATION OF NEW YORK.

MOVING-PICTURE MACHINE.

1,274,242.  Specification of Letters Patent.  Patented July 30, 1918.

Application filed September 24, 1912, Serial No. 722,010. Renewed December 17, 1917. Serial No. 207,627.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines, of which the following is a specification.

My present invention has reference to a tension device for holding the film under tension. A common fault of tension devices which have heretofore been used, is that they are designed to exert a certain fixed tension upon the film, and this regardless of the surface conditions of the film. The surface of the commercial film varies considerably, some films, or even sections of the same film, being relatively smooth and uniform in character, while other films or sections of film may be more or less rough and uneven as to surface. The ordinary tension device being designed merely to exert a certain fixed tension, does not take into account these variations in the surface of the film and hence the actual tension exerted on the film by these prior devices will vary in accordance with the surface conditions of the film. The action of the tension device may be either intermittent or continuous and in either event the better practice is to have the tension device exert its tension upon the film during at least a portion of the time that the intermittent film advancing means is operating to advance the film, for by so doing, the tension device exerts a retarding effect upon the film and thereby assists in keeping the film under better and more absolute control. The action of the tension device thus bears a direct relation to the operation of the film advancing means, since the one acts in opposition to the other. While the film advancing means is acting to advance the film, the tension device is exerting its tension to retard the film, and if the tension varies, as it does with the tension devices in present use, then the load on the film advancing means will vary. This variation in load on the advancing means is objectionable in that it prevents accurate registry at the exposure opening, and especially is this true where the film advancing means is of the "beater" type.

In order to reduce to a minimum the time consumed in shifting the film, the film is moved down past the exposure opening at a relatively high rate of speed, and this quick movement necessarily adds a certain amount of "momentum" to the film. The tension device is relied upon to check this momentum and bring the film to a stop in proper register with the exposure opening. It has been pointed out how with the present tension devices the tension exerted upon the film will vary according to the surface characteristics of the film, and hence will be non-uniform. And since to secure absolute register at the exposure opening, the retarding effect of the tension device should be uniform, it will be understood that one of the reasons for the lack of true register in the present machines is due to this lack of uniform tension on the film.

Having outlined in a general way some of the present difficulties in the art, I would state that my invention has as its object to overcome these various objections and to provide a tension device which will maintain a substantially uniform tension on the film regardless of the surface conditions of the film.

In its preferred form the invention embodies a tension device in which there is provided a support over which the film passes, and clamping means arranged to engage the film passing over the support, adapted to automatically adapt itself to irregularities in the surface of the film, whereby to compensate for such irregularities and maintain a substantially uniform tension on the film. In the specific form herein disclosed, the film support is the member in which the exposure opening of the machine is formed, and the clamping means takes the form of a plurality of longitudinally alined clamping shoes arranged to engage the film at both sides of the exposure opening, and which are so mounted as to yield readily at any point in their length so as to accommodate themselves automatically to any irregularities in the film.

Various other features of the invention will appear as the specification proceeds.

I have, in the accompanying drawings, illustrated a preferred embodiment of my invention, but I would have it understood that various changes and modifications may be made therein without departing from the spirit and scope of the invention.

In the drawings:

Figure 1 is a broken and more or less diagrammatic view of a moving picture machine embodying my present improvements.

Fig. 2 is an enlarged transverse sectional view of the tension device taken substantially on the line 2—2 of Figs. 2 and 6.

Figs. 3 and 4 are detail views respectively of a set of the clamping shoes, and one of the tension springs.

Fig. 5 is a view of the clamping gate, looking at the outside of the same.

Fig. 6 is a similar view looking at the inside of the gate.

Fig. 7 is a longitudinal sectional view of the gate taken on the line 7—7 of Fig. 5.

Fig. 8 is a like sectional view taken on line 8—8 of Fig. 5.

Like reference characters refer to like parts throughout the several views.

Referring particularly to the first view, the numeral 10, designates the tension device, 11 the means for intermittently advancing the film, and 12, a take-up device for winding in the film as fast as it is advanced. The film, which is designated 13, may be withdrawn from a suitable support and advanced to the tension device by means of a feeding sprocket 14.

In its detailed construction the tension device preferably consists of a backing or support 15, over the face of which the film passes, and clamping means in the form of a series of longitudinally alined shoes 16, which press the film against the support. These so-called clamping shoes are disposed in longitudinal alinement at each side of the exposure opening 17 of the machine, so as to hold that portion of film which is being exposed or exhibited. The exposure opening is here shown as formed in the film support 15. The clamping shoes of each set are mounted so as to yield freely and independently of each other. This is accomplished in the present instance by supporting them on flexible hanger straps 18. The shoes are secured to their supports by screws 19 or other suitable fastenings and are furthermore secured in such a way as to permit the individual shoes to yield freely at any point in the length thereof. To this end the shoes are preferably each secured at a point intermediate the ends of the same, as best shown in Figs. 3 and 7. An abutment 20, is preferably provided to hold the body of the shoe out of contact with the supporting strap except at the very point of support. This method of mounting the shoes permits each shoe to rock freely about its center of support.

To facilitate threading the film through the machine, the tension device is preferably made so that it may be opened up to release its hold on the film. This is conveniently accomplished by mounting the clamping devices on a gate 21, hinged at 22, so that it may be swung to carry the clamping shoes either into or out of engagement with the film passing over the support. For the purpose of guiding and holding the clamping shoes of each set in proper longitudinal alinement, they are preferably received and guided within the parallel slots 23 in the gate.

Tension means of a suitable character is employed for forcing the clamping shoes with a yielding pressure against the film; such clamping means in the present case takes the form of the springs 24 which have their opposite ends bent under, as indicated at 25, to bear upon two of the adjoining clamping shoes. These springs exert their tension upon the clamping shoes at points intermediate the ends of such shoes for the reason, as before pointed out, of permitting the shoes to yield at any point in the length of the same. The tension may therefore be conveniently applied to the shoes by having the ends of the tension springs bear upon the screws of other fastening means by which the shoes are secured in place, substantially as indicated in Fig. 7. The tension springs are supported in any convenient manner and for the purpose of securing a certain adjustment of the tension, the springs are here shown as mounted in a support 26 which is adjustable toward and away from the gate which carries it. This support, as best shown in Fig. 8, is here made of spring metal fastened at its upper end at 27 to the gate, and made adjustable toward and away from the gate by means of the adjusting screw 28 which is mounted on a stud 29 fast to the gate and has a bearing against the support 26. When the spring support is thus itself made of spring metal, the tension springs might be formed integral with the support, but for convenience of replacement the tension springs are preferably made separate from the support which carries them. A preferred way of securing the tension springs upon the support is shown in Figs. 5 and 7 wherein the support is provided with guides 30 at its lower end to receive the springs, in which guides the respective springs may be held by any suitable means, such as studs 31 which enter in an opening 32 in the body portion of each of the springs.

The tension device may be designed to exert either a continuous or an intermittent pressure upon the film. In the case illustrated the tension device is arranged to exert a continuous pressure upon the film, and the clamping gate when closed is therefore simply locked in such position by suitable means, such as the spring catch 33 which is arranged to engage a lug 34 on the gate (see Figs. 1 and 2).

In the handling of "fresh" or "sticky"

film, a certain amount of the emulsion on the face of the film is liable to be scraped off by the various devices through which the film passes. If no provision were made, this emulsion might accumulate upon the face of the clamping shoes, which might cause an increase in the tension exerted by said shoes. To prevent such happening, I provide means whereby to prevent any accumulation of emulsion or other material upon the face of the clamping shoes. The means for this purpose here consists in making the shoes with a longitudinal groove 35 in the face of the same. With this construction the emulsion or other foreign material instead of adhering to the face of the clamping shoes, passes on into this groove in the shoe where it can do no harm. This grooving of the face of the clamping shoes thus makes them self-cleaning.

In the operation of the invention, as so far described, when a clot, obstruction or other roughness on the face of the film passes beneath the first clamping shoe, the said shoe simply rocks outwardly around its center of support and without increasing the tension to any sensible degree. As the obstruction passes on down, the shoe simply rocks farther out, the shoe thereby automatically adjusting itself to the obstruction. At the time the obstruction passes under the point of support of the shoe, the shoe will no longer be able to rock about its center of support but will be forced outward bodily. If no provision were made for this, this bodily shifting of the shoe might cause a detrimental increase in the tension. I provide for this contingency by making the tension springs relatively flexible and of considerable length, as best shown in Fig. 7. The doubling under of the ends of the springs serves to increase their length without adding materially to their bulk. The springs are thus made so sensitive that the slight outward movement occasioned by the obstruction passing under the center of support for the shoe, does not occasion any material increase in the tension on the film. Another factor in the accomplishment of a uniform tension is the making of the holding means in a series of relatively short members instead of a single long clamping bar, as in the tension devices heretofore constructed. This arrangement causes a breaking up and distribution of the tension, and these various features combine to make the tension device act in such a way as to compensate automatically for the various inequalities in the surface of the film so as to maintain the tension upon the film substantially uniform.

The clamping gate is provided with an opening 36 to register with the exposure opening in the film support, and for the purpose of securely holding the film at the exposure opening, one pair of the clamping shoes is preferably arranged so as to overlap, or at least extend across the full width of the exposure opening, substantially as indicated in Fig. 6. The pressure of the tension springs is preferably adjusted to "iron out" any wrinkles there may be in the film.

The heat of the beam of light passing through the film at the exposure opening is sometimes sufficient to set the film on fire. A feature of my invention consists in confining any such blaze that may occur, strictly to that portion of film at the exposure opening. I accomplish this result by restricting the film passage in the tension device adjacent the exposure opening to such an extent as to smother any blaze in the film. In Fig. 2 is shown how the face of the clamping gate (represented here by the line 37), when the gate is closed, is spaced apart from the film so as to leave a free passage for the film. In like fashion the film support is preferably recessed, as indicated at 38, to provide a like free space at the opposite side of the film. Means for restricting this film passage between the film support and clamping gate may be in any suitable form, and the same here consists in forming the clamping gate with raised portions 39 adjacent the exposure opening and preferably both above and below said opening. These raised portions restrict the film passage to such a point as to confine and limit any blaze which may be generated at the exposure opening strictly to that portion of film then framed in the exposure opening. As the clamping shoes bear upon the edges of the film at each side of the exposure opening, these will prevent any blaze in the film from spreading sidewise. Hence by my invention, if the film should catch fire at the exposure opening, the only portion that can be burned will be the small piece of film then framed in the exposure opening. Thus practically only the one picture in a film can be destroyed by fire, and this will be accomplished without breaking or interrupting the continuity in the film.

Means also are preferably provided for preventing any sidewise shifting of the film during its passage past the exposure opening. Such means is here shown in the form of shoulders 40 on the film support, which are arranged to be engaged by the side edges of the film so as to guide the same in a straight path.

What is claimed is:—

1. A moving picture machine comprising: a film support, and means for holding the film in engagement with the support including a plurality of longitudinally alined clamping members, yielding supporting means for said clamping members to permit independent yielding of said clamping members to the variation in the surface of the film, and tension means interconnecting said clamping members to maintain a substantially uniform tension regardless of the independent yielding of said members.

2. A moving picture machine comprising: a film support, and means for holding the film in engagement with the support including: two sets of longitudinally alined clamping members, a yielding supporting means for each set of longitudinally alined clamping members, to permit independent yielding of each clamping member to the variation in the surface of the film, and tension means for each set of longitudinally alined clamping members to maintain a substantially uniform tension on the clamping members of each set regardless of the independent yielding of either member of said set.

3. The combination with a film support, of means for holding the film in engagement with the same comprising two independently movable clamping members arranged in longitudinal alinement, and a double-ended spring having its opposite ends bearing upon the intermediate portion of the respective clamping members and permitting the same to yield independently under its tension.

4. The combination with a film support provided with an exposure opening therein, of means for holding the film in engagement with the support comprising a hinged gate, independently movable clamping members supported in longitudinal alinement on said gate, and a spring supported on the gate having arms extending in opposite directions and engaging the intermediate portions of adjacent clamping members.

5. The combination with a film support, of means for holding the film in engagement with the same comprising two sets of clamping members arranged in parallelism, each set consisting of a plurality of longitudinally alined and independently movable members, and spring means engaging each of the longitudinally alined clamping members at a point intermediate its ends to yieldingly force the same toward the film support.

6. The combination with a film support provided with an exposure opening therein, of parallel clamping shoes arranged to engage the film on opposite sides of the exposure opening, the said shoes having longitudinal grooves in the contact faces thereof, and means for forcing the shoes toward the film support with a yielding pressure.

7. The combination with a film support provided with an exposure opening therein, of a plurality of independently movable longitudinal alined clamping shoes arranged to engage the film at opposite sides of the exposure opening, the said shoes having longitudinal grooves in the contact faces thereof, and means for forcing the respective clamping shoes toward the film support with a yielding pressure.

8. The combination with a film support provided with an exposure opening therein, of a gate hinged to the film support provided with an opening in line with the exposure opening, the said gate having parallel slots therein arranged to lie on opposite sides of the exposure opening, flexible supporting straps overlying said slots, clamping shoes guided in the slots and secured to the straps so as to be supported thereby, and springs acting upon the respective clamping shoes at points intermediate the ends of the same to force said shoes toward the film support with a yielding pressure.

9. The combination with a film support provided with an exposure opening therein, of a gate hinged to the film support and provided with an opening in line with the exposure opening, independently movable and longitudinally alined clamping shoes carried by the gate and arranged to engage the edges of the film at opposite sides of the exposure opening, and double-ended springs carried by the gate at opposite sides of the opening therein, each of said springs having its opposite ends bent inwardly and the extremities thereof bearing upon adjacent longitudinally alined clamping shoes at points intermediate the ends of said shoes.

10. In a moving picture machine, the combination with a film support provided with an exposure opening therein, a clamping gate movably related to the film support, longitudinal clamping shoes carried by the gate and arranged to bear upon the film at opposite sides of the exposure opening, flexible supports for the clamping shoes arranged to permit each shoe to yield at any point in the length thereof, and means for forcing the clamping shoes toward the film support with a yielding pressure.

11. In a moving picture machine, the combination with a film support provided with an exposure opening therein, of a clamping gate movably related to the film support, longitudinal clamping shoes carried by the gate and arranged to bear upon the film at opposite sides of the exposure opening, means supporting the shoes at points intermediate the ends of the same whereby said shoes may rock upon the centers of support and means for forcing the shoes toward the film support with a yielding pressure.

12. In a moving picture machine, the combination with a film support provided with an exposure opening therein, of a clamping gate movably related to the film support, a plurality of longitudinally alined clamping shoes carried by the gate and arranged to bear upon the film at opposite sides of the exposure opening, means supporting the clamping shoes at points intermediate the ends of the same whereby the shoes may rock upon the centers of support and tension means for forcing the shoes toward the film support with a yielding pressure.

13. In a moving picture machine, a tension device for holding the film under tension, comprising, a backing over which the film passes, a plurality of longitudinally alined and independently movable clamping members, tension means for forcing the said clamping members toward the backing with a yielding pressure, a movable support for such tension means, and means for shifting such support to vary the pressure exerted by the tension means.

14. A tension device for moving picture machines, comprising, a backing over which the film passes, longitudinal clamping members arranged to press the edges of the film against said backing, tension means acting on the clamping members, a movable support for the tension means, and means for shifting the said support to vary the pressure exerted by the tension means.

15. In a moving picture machine, a tension device for holding the film under tension, comprising, a backing over which the film passes, a plurality of longitudinally alined and independently movable clamping members, and springs each supported at an intermediate point and having its opposite ends turned under and bearing upon two adjoining clamping members.

16. In a moving picture machine, the combination with a film support over which the film passes, of a gate hinged with respect thereto and having parallel slots therein in line with the edge portions of the film passing over the support, flexible supports on the gate, overhanging the slots therein, a plurality of longitudinally alined clamping shoes engaged in each of the slots and supported by the flexible supports aforesaid, and tension means acting on the said clamping shoes.

17. In a moving picture machine, the combination with a film support over which the film passes, of a gate hinged with respect thereto and having parallel slots therein in line with the edge portions of the film passing over the support, flexible supports on the gate, overhanging the slots therein, a plurality of longitudinally alined clamping shoes engaged in each of the slots and supported by the flexible supports aforesaid, and springs mounted over the clamping shoes, each having its opposite ends bent under and engaging two of the clamping shoes.

18. In a moving picture machine, the combination with a film support over which the film passes, of a gate hinged with respect thereto and having parallel slots therein in line with the edge portions of the film passing over the support, flexible supports on the gate, overhanging the slots therein, a plurality of longitudinally alined clamping shoes engaged in each of the slots and supported by the flexible supports aforesaid, a movable supporting member mounted on the gate, means for adjusting said supporting member to carry it toward or away from the gate, and tension springs carried by the movable support, each having its opposite ends bearing upon two adjoining clamping shoes.

19. The combination with a film support provided with an exposure opening therein, of a clamping gate hinged with respect to the film support and carrying tension means to engage the film passing over the film support, the said gate having an opening therein to register with the exposure opening and provided further with raised portions adjacent the opening therein to restrict the space between the gate and the film support adjacent to the exposure opening.

20. The combination with a film support provided with an exposure opening therein, of a gate hinged with respect to the film support and carrying tension means to engage with the film passing over the support, the said gate having an opening therein in line with the exposure opening and arranged when in closed operative position to provide a space between the face of the film support and the body of the gate, and means for restricting the space between the film support and gate adjacent to the exposure opening, whereby to prevent a blaze of the film at the exposure opening being communicated to the rest of the film.

21. The combination with a film support provided with an exposure opening therein, of a gate hinged with respect to said support and provided with an opening in line with the exposure opening, tension means carried by the gate, engaging the film passing over the film support and arranged by such pressure on the film to hold the body of the gate spaced from the face of the film support, and means for restricting the space between the gate and film support adjacent to the exposure opening whereby to prevent a blaze of the film at the exposure opening being communicated to the adjoining film.

Signed at New York city, in the county of New York and State of New York, this 17th day of September, A. D. 1912.

JAMES A. CAMERON.

Witnesses:
LOUSIA E. SIMEON,
AXEL V. BEEKEN.